(12) United States Patent  
Matsuoka

(10) Patent No.: US 6,287,012 B2  
(45) Date of Patent: Sep. 11, 2001

(54) ROLLER BEARING RETAINER

(75) Inventor: Hideki Matsuoka, Miyota-machi (JP)

(73) Assignee: Minebea Co., Ltd., Nagano (JP)

( * ) Notice: Subject to any disclaimer, the term of this patent is extended or adjusted under 35 U.S.C. 154(b) by 0 days.

(21) Appl. No.: 09/321,712

(22) Filed: May 28, 1999

(30) Foreign Application Priority Data

Aug. 4, 1998 (JP) ................................. 10-220131

(51) Int. Cl.$^7$ ................................. F16C 33/38
(52) U.S. Cl. ................................. 384/531
(58) Field of Search ................................. 384/531, 532, 384/534, 528, 527

(56) References Cited

U.S. PATENT DOCUMENTS

| | | | |
|---|---|---|---|
| 980,932 | * | 1/1911 | Eitner ................................. 384/531 |
| 1,352,110 | * | 7/1920 | Brakenhielm ................................. 384/531 |
| 3,506,316 | | 4/1968 | McKee . |
| 4,225,199 | | 9/1980 | Earsley . |

OTHER PUBLICATIONS

Patent Abstracts of Japan, Publication No. 07–208482, Aug. 11, 1995.

* cited by examiner

*Primary Examiner*—Lenard A. Footland  
(74) *Attorney, Agent, or Firm*—Oliff & Berridge PLC

(57) ABSTRACT

A roller bearing retainer comprising a substantially ring-shaped member having a plurality of ball pockets formed thereon to hold rolling members. Each ball pocket has a flat portion formed at its bottom portion and an opening portion extending from the flat portion of the retainer's ball pockets for receiving a rolling member. Each rolling member is held by a ball pocket having the flat portion whereby movement of the rolling member is suppressed. At the same time, a sufficient gap may be formed between the rolling member and a concave surface other than the flat portion. Thus, lubrication oil may readily be placed into the gap.

3 Claims, 3 Drawing Sheets

ROLLER BEARING RETAINER

BACKGROUND OF THE INVENTION

1. Field of Invention

The present invention relates to a retainer for a roller bearing for holding a rolling member such as a ball, in which a flat portion is formed in a ball pocket having a spherical inner circumferential surface.

2. Description of the Related Art

A conventional retainer for a roller bearing (hereinafter simply referred to as a retainer) will now be described with reference to FIG. 5 which shows an example of a retainer 1 used in a bearing to which a load is applied in an axial direction, i.e., a radial roller bearing. The retainer 1 is formed of a ring-shaped member. A plurality (eight in the drawing) of ball pockets 2 for holding rolling members (not shown) such as balls are formed on one side surface in the axial direction. Inner circumferential surfaces (concave surfaces) of these ball pockets 2 are formed into a spherical shape corresponding to the shape of the outer circumferential surfaces of the rolling members. The rolling members are mounted on the retainer 1 to thereby form a bearing body for the roller bearing.

In the above-described prior art, in which the retainer holds the rolling members only with the single concave surface (spherical surface) formed in each ball pocket, in order to reduce vibration of the retainer, it is effective to reduce a curvature of the concave surface of the ball pocket and to narrowly hold the rolling member, i.e., to use a method to hold of holding the rolling member so as not to generate any gap between the rolling member and the concave surface. However, in the above-described case, lubricant is not introduced in the space between the rolling member and the concave surface. In fact, in some cases, the lubrication for the rolling member would be sacrificed. Thus, there is a fear that a service life of a normal noise preventing function would be shortened.

Also, inversely, it is possible to increase the curvature of the concave surface of the ball pocket in view of sufficient lubrication to the rolling members. However, in such a case, an amount of movement of the retainer relative to the rolling member is increased and vibration is generated in the retainer when the bearing is rotated producing the fear that the service life of the noise preventing function that should be maintained normally would be degraded.

SUMMARY OF THE INVENTION

In order to overcome the above-noted defects, an object of the present invention is to provide a rolling bearing retainer which has a sufficient lubrication function and in which vibration of the retainer is suppressed.

According to a first aspect of the invention, there is provided a rolling bearing retainer in which a plurality of ball pockets having opening portions on one side surface in an axial direction of a ring-shaped member are formed in an equal interval in a circumferential direction, and a plurality of rolling members are held by the ball pockets, wherein at least one flat portion, which is to be brought into contact with the rolling members, is formed in an inner circumferential surface of the ball pockets.

According to the first aspect of the invention, at least one flat portion, with which the rolling member is brought into contact, is formed in the inner circumferential surface of each ball pocket formed at the equal interval in the circumferential direction on one side surface in the axial direction of the ring-shaped member, whereby the movement of the rolling member engaged with the ball pocket at the flat portion is suppressed. Also, the gap between the concave surface (spherical surface), other than the flat portion, and the rolling member is formed largely to enhance the flow of the lubricant and thereby to enhance the lubrication of the rolling member.

DETAILED DESCRIPTION OF THE PREFERRED EMBODIMENTS

Figure 1:
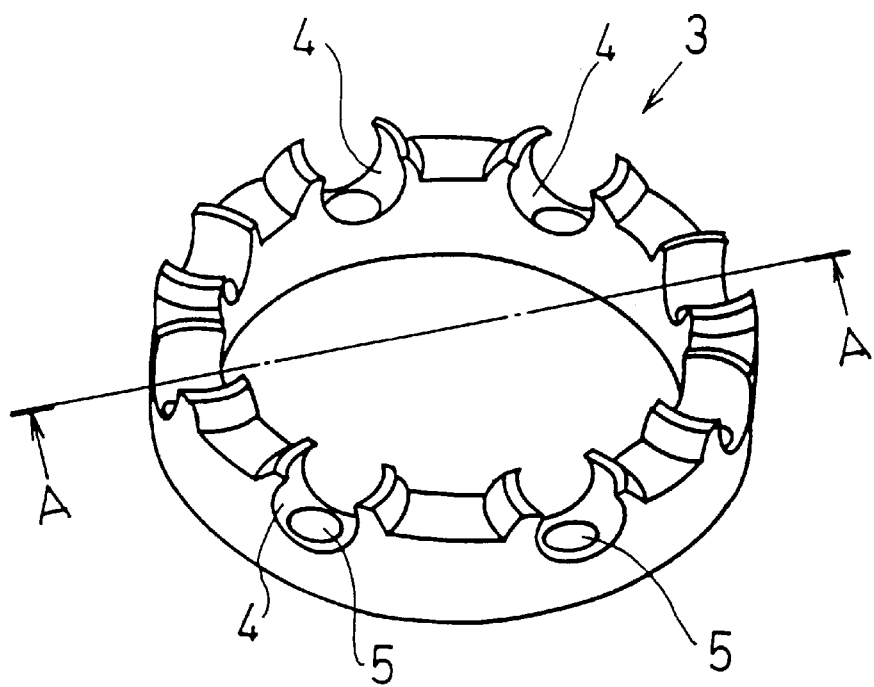
FIG. 1 is a perspective view showing a roller bearing retainer according to one embodiment of the present invention.
Figure 2:
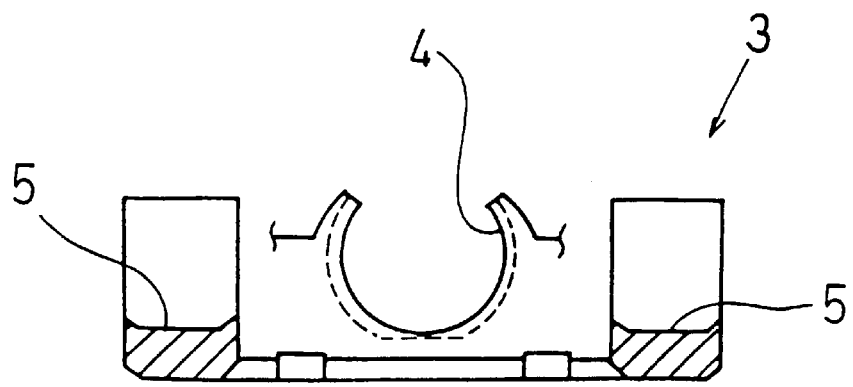
FIG. 2 is a cross-sectional view taken along the line A—A of FIG. 1.
Figure 3:
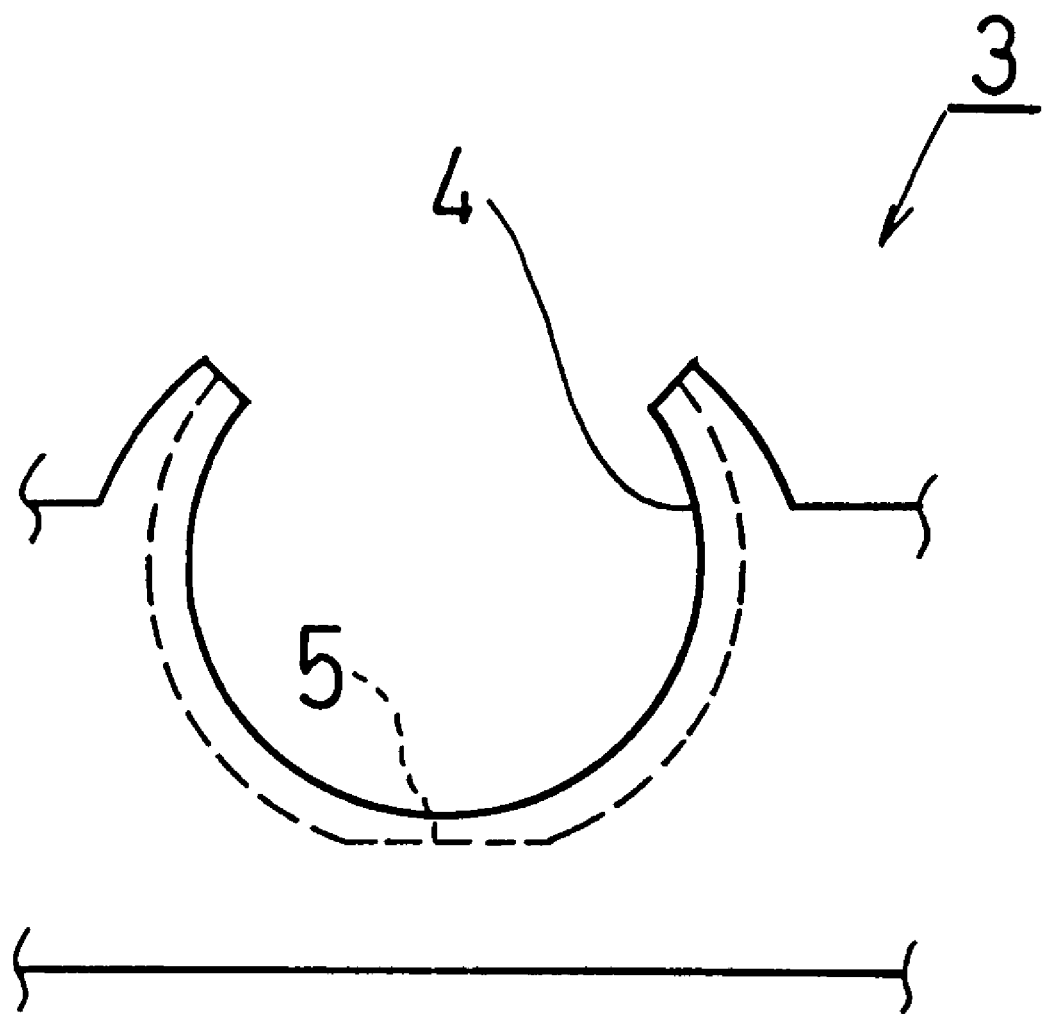
FIG. 3 is an enlarged view of a part of a ball pocket shown in FIG. 2.
Figure 4:
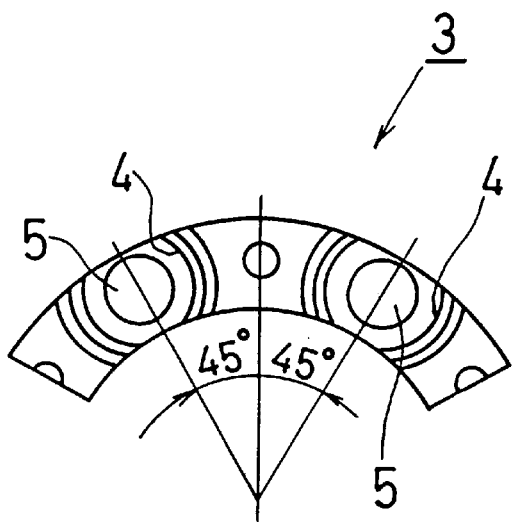
FIG. 4 is a top plan view of that shown in FIG. 1.
Figure 5:
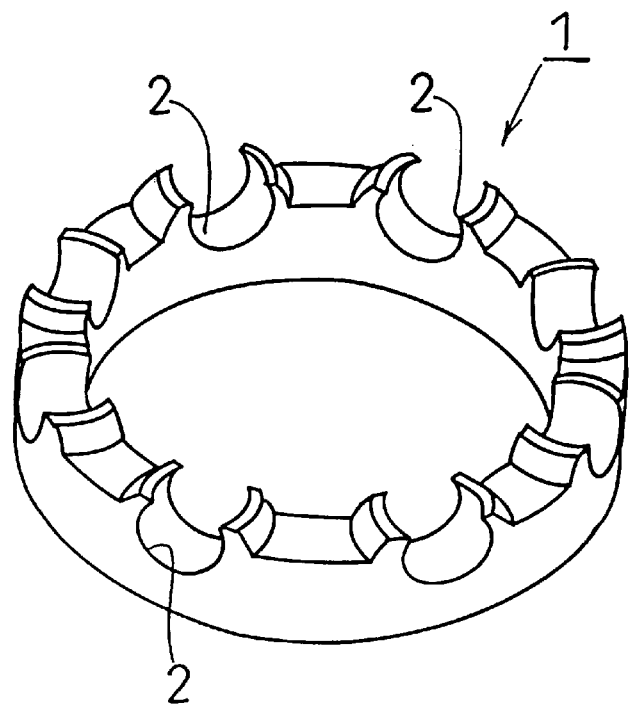
FIG. 5 is a perspective view showing a conventional roller bearing retainer.

An embodiment of the present invention will now be described with reference to FIGS. 1 to 4. In FIG. 1, reference numeral 3 denotes a rolling bearing retainer according to the present invention.

The retainer 3 is formed of a substantially ring-shaped member. A plurality of ball pockets 4 are formed to hold rolling members. Each of the plurality of ball pockets 4 have inner concave surfaces which are formed correspondingly to the shape of outer periphery surface of a rolling member. The ball pockets so formed each hold a rolling member. The ball pockets 4 are formed at equal intervals in the circumferential direction, i.e., at eight positions at an angular interval of 45° as shown in FIG. 1. The retainer 3 is made of resin, for example, thermoplastic resin such as nylon 66, PPS (polyphenylene sulfide) or the like.

A flat portion 5 is formed on a circumferential surface of each ball pocket 4 of the retainer 3, i.e., a bottom of each ball pocket 4 is flat. The flat portion 5 is formed only at one position of the bottom surface of each ball pocket 4. However, it is possible to provide the flat portion 5 at a position other than the bottom surface, as along the concave surfaces. When the retainer 3 supports a rolling member, in the prior art, the rolling member is supported on the concave surfaces, whereas according to the present invention, a rolling member is supported on a line or at a point by the above-described flat portion 5. By providing such flat portion 5, the movement of a rolling member within the ball pocket 4 may be suppressed by the flat portion 5, and the amount of movement of the retainer 3 relative to a rolling member is likewise suppressed.

The amount of movement of the above-described retainer 3 relative to the rolling member, which is one of factors causing vibration of the retainer 3, may be controlled by setting a dimension or portion other than the flat portion and/or a line or a point of the flat surface 5 in which the ball pocket 4 of the retainer 3 is in contact with the rolling member.

Also, with respect to the concave surfaces constituting the portion other than the flat portion of the ball pocket 4, in order to accelerate the supply of lubricant into the ball pocket 4, the curvature of the concave surfaces of the ball pocket 4 is set large to provide a sufficient gap between the concave surfaces of the ball pocket 4 and the surface of the rolling member. Thus, the amount of the movement of retainer 3 relative to rolling member may be suppressed, and the lubrication performance of the retainer may be ensured.

As described above, since the flat portion 5 is formed at one position within the ball pocket 4 of the retainer 3, if a rolling member is closely held by the flat portion 5, i.e., in such a manner that no gap is generated between the rolling member and the concave surfaces, the amount of movement of the retainer 3 relative to the rolling member becomes small enough to suppress vibration. When, a sufficient gap is formed between the concave surface and the rolling member at a portion of the concave surfaces other than the flat portion 5, lubricant is effectively placed into the gap to thereby enhance the lubrication performance. Incidentally, if one or more flat portions 5 are formed, the movement of a rolling member is suppressed and the lubrication property is not degraded. However, if the number of flat portions 5 is excessive, the smoothness of the mutual movement between the Vario rolling members and the retainer 3 would be degraded.

According to a first aspect of the invention, since an interior of each ball pocket is defined by the concave surfaces and one or more flat portions 5, even if the curvature of a concave surface is not small, it is possible to hold the rolling member in the suppressed condition by the flat portions 5. Thus, the amount of movement of the retainer relative to a rolling member is suppressed so that the vibration of the retainer may be reduced. Accordingly, upon the rotation of the rolling bearing retainer, the generation of vibration is reduced and noise prevention and rotational performance are enhanced.

Also, with the flat portion 5 provided inside of each ball pocket, since the movement of the retainer relative to a rolling member is suppressed, the curvature of the concave surface may be set large enough so that lubricant may be effectively placed between the concave surfaces and a rolling member. As a result, it is possible to enhance the lubrication property and to prolong the service life of the noise preventing function. As described above, it is also possible to prolong the service life of the roller bearing.

Furthermore, by setting the position where the retainer is brought into contact with the rolling member, i.e., the line and point of the flat portion 5 or the surface of the portion other than the flat portion, i.e., by setting the parameter of holding the rolling member, it is possible to control the amount of movement of the retainer 3 relative to the rolling member and to suppress the vibration of the rolling bearing retainer 3 with good lubrication property. Thus, it is possible to simultaneously attain improvement of the noise preventing function and the rotation property.

Various details of the invention may be changed without departing from its spirit or its scope. Furthermore, the foregoing description of the embodiments according to the present invention is provided for the purpose of illustration only, and not for the purpose of limiting the invention as defined by the appended claims and their equivalents.

What is claimed is:

1. A rolling bearing retainer, comprising:
    a plurality of ball pockets having opening portions on at least one side surface in an axial direction of a ring-shaped member are formed at equal intervals in a circumferential direction;
    a plurality of rolling members are held by said ball pockets;
    at least one flat portion, which is to be brought into contact with the rolling member held in a ball pocket, is formed in an inner circumferential surface of each of said ball pockets; and
    a width of the radial direction of said flat portion is smaller than a width of the radial direction of the rolling bearing retainer.

2. A rolling bearing according to claim 1, wherein a lubricating gap is maintained between the rolling member and the inner circumferential surfaces of the ball pocket it resides in as a result of the seating of the rolling member upon the at least one flat portion.

3. A rolling bearing retainer according to claim 1, wherein said at least one flat portion is formed on the bottom surface of each of the ball pockets.

* * * * *